US012504451B2

(12) United States Patent
Ferree

(10) Patent No.: US 12,504,451 B2
(45) Date of Patent: Dec. 23, 2025

(54) QUICK METER CONNECT ELECTRIC CHARGING SYSTEM

(71) Applicant: Kevin John Ferree, La Mesa, CA (US)

(72) Inventor: Kevin John Ferree, La Mesa, CA (US)

( * ) Notice: Subject to any disclaimer, the term of this patent is extended or adjusted under 35 U.S.C. 154(b) by 324 days.

(21) Appl. No.: 18/362,647

(22) Filed: Jul. 31, 2023

(65) Prior Publication Data

US 2023/0375603 A1 Nov. 23, 2023

Related U.S. Application Data

(63) Continuation-in-part of application No. 17/216,612, filed on Mar. 29, 2021, now Pat. No. 11,715,921.

(51) Int. Cl.
| | | |
|---|---|---|
| *G01R 22/06* | (2006.01) | |
| *B60L 53/16* | (2019.01) | |
| *B60L 53/66* | (2019.01) | |

(52) U.S. Cl.
CPC ............ *G01R 22/063* (2013.01); *B60L 53/16* (2019.02); *B60L 53/665* (2019.02)

(58) Field of Classification Search
CPC ....... H01R 33/94; H01R 33/955; Y02T 10/70; Y02T 10/7072; Y02T 90/14; G01R 22/065; G01R 11/04; B60L 53/16
See application file for complete search history.

(56) References Cited

U.S. PATENT DOCUMENTS

| | | | |
|---|---|---|---|
| 3,957,118 A | 5/1976 | Barry et al. | |
| 4,416,494 A | 11/1983 | Watkins et al. | |
| 5,361,026 A * | 11/1994 | Pruehs | G01R 35/00 |
| | | | 324/133 |
| 5,588,874 A | 12/1996 | Pruehs et al. | |
| 6,059,605 A | 5/2000 | Robinson et al. | |
| 6,188,145 B1 | 2/2001 | Stewart | |
| 6,325,666 B1 | 12/2001 | Robinson et al. | |
| 6,737,855 B2 | 5/2004 | Huber et al. | |
| 6,798,191 B1 | 9/2004 | Macfarlane et al. | |
| 6,825,776 B2 | 11/2004 | Lightbody et al. | |
| 6,846,199 B1 | 1/2005 | Robinson et al. | |
| 7,030,514 B2 | 4/2006 | Wareham et al. | |
| 7,158,050 B2 | 1/2007 | Lightbody et al. | |
| 7,648,389 B1 | 1/2010 | Scott et al. | |
| 8,435,070 B2 * | 5/2013 | Curanovic | H01R 33/945 |
| | | | 439/167 |
| 8,581,450 B2 | 11/2013 | Mathiowetz | |

(Continued)

FOREIGN PATENT DOCUMENTS

WO 2017046116 A1 3/2017

*Primary Examiner* — Jean F Duverne
(74) *Attorney, Agent, or Firm* — Jonathan Kidney; Intelink Law Group, PC

(57) ABSTRACT

A removable electrical meter quick connect device has a housing with a first face configured with connectors to mate to an electrical service panel in a meter connection manner, and a second face with an electrical meter, or connectors to mate to an electrical meter. First and second set of lines are within the housing, connected from the first face to the second face. At least one breaker switch or breaker switch receptacle is on the housing and coupled to at least one of the first and second set of lines. Additional set(s) of lines are connected to the breaker switch(es) and exit a side of the housing to provide an external source of power (in/out) via the device, without requiring typical electrical panel work.

28 Claims, 22 Drawing Sheets

(56) References Cited

U.S. PATENT DOCUMENTS

| | | |
|---|---|---|
| 8,784,130 B2 | 7/2014 | Scott et al. |
| 9,391,414 B2 | 7/2016 | Seals |
| 9,500,672 B1 | 11/2016 | Bautista et al. |
| 9,627,861 B2 | 4/2017 | Cruz |
| 9,728,972 B2 | 8/2017 | Cruz |
| 2004/0066311 A1 | 4/2004 | Giles et al. |
| 2006/0082955 A1* | 4/2006 | Robinson ............... G01R 11/04 361/663 |
| 2011/0159725 A1 | 6/2011 | Curto |

* cited by examiner

QUICK METER CONNECT ELECTRIC CHARGING SYSTEM

CROSS-REFERENCE TO RELATED APPLICATION(S)

This application is a Continuation-in-Part and claims the benefit of U.S. non-provisional patent application Ser. No. 17/215,612, filed Mar. 29, 2021, issuing as U.S. Pat. No. 11,715,921, on Aug. 1, 2023, the contents of which are hereby incorporated by reference in its entirety.

FIELD

This invention relates to electric charging directly from the meter side. More particularly, it relates to a device that can be easily installed between a utility meter and utility panel to allow interfacing with an electric automobile for the purpose of charging, as well as to associated devices and systems connected to the exemplary device.

BACKGROUND

With the popularity of electric vehicles, more and more owners are installing chargers in their homes, apartments, condominiums and businesses to charge their vehicles. This requires several hours of services by an electrician to rewire electrical panels, install outlets, conduits, run cables, cut and core through walls as well as attach an Electric Vehicle Charger to a wall somewhere. Typically, this effort is considered a custom job and can be several thousands of dollars, not including the cost of the charger. Further, once the home is sold, the owner usually does not wish to invest more money to remove the charger, often leaving it for the next owner who may not have an electric car. Therefore, it would be beneficial to have a standardized device that easily interfaces with the standardized electrical utility meter system and is simple to install or remove, to achieve the same end.

To that effect, various methods and systems are described below that enable the rapid quick installation of a simple and relatively inexpensive interfacing device to the "house's" metering system to enable "separate-from-home" charging capabilities applicable to an electric car as well as other devices and systems.

SUMMARY

The following presents a simplified summary in order to provide a basic understanding of some aspects of the claimed subject matter. This summary is not an extensive overview and is not intended to identify key/critical elements or to delineate the scope of the claimed subject matter. Its purpose is to present some concepts in a simplified form as a prelude to the more detailed description that is presented later.

In one aspect of the disclosed embodiments, an electrical quick meter connect device is provided, comprising: an environmental housing with a first face is configured with connectors to mate directly to an electrical service panel in a meter connection manner, and a second face is configured with connectors to mate directly to a utility meter in an electrical service panel connection manner; a first and second set of lines, internal to the housing, coupled to the first face to the second face; at least one breaker switch integral to and disposed on an external side of the housing and coupled to at least one of the first and second set of lines; and at least one external power line coupled to the at least one breaker switch and exiting the housing providing at least one of external power output and external power input, wherein the quick meter connect device is configured to be inserted directly between a meter and electrical service panel to provide external power connection.

In another aspect of the disclosed embodiments, the above device is provided, wherein the at least one breaker is connected in parallel to at least one of the first and second set of lines; and/or wherein the at least one breaker is connected in series to at least one of the first and second set of lines; and/or wherein the at least one external power line is removably coupled to the housing; and/or further comprising at least one of a timer, clock, wireless transmitter, cellular transceiver, computer, second meter, Wi-fi, cellular repeater, satellite, Bluetooth®, capacitor, inductor, chokes, is coupled to at least one of the first and second set of lines; and/or further comprising at least one of an indicator light, screen, meter, and breaker switch cover is disposed on the environmental housing; and/or wherein the second face is offset from an orientation of the first face; and/or wherein the environmental housing with the first face is disposed on a larger side of the environmental housing and the second face is disposed on a smaller side of the environmental housing; and/or further comprising at least one of a wireless transmitter, Wi-Fi, Bluetooth®, Satellite, and cellular transceiver providing at least one of logging information to an external device, global position and data services; and/or further comprising, a wired connection data jack port providing communications via at least one of fiber optic, RG6, Cat 5, and telecom cables; and/or further comprising: a wired connection data jack port providing communications via at least one of fiber optic, RG6, Cat 5, and telecom cables; and a remote communication base station hub connected to the wired data connection jack port; and/or wherein the remote communication base station has at least one of a wireless transmitter, Wi-Fi, Bluetooth®, Satellite, and cellular transceiver; and/or wherein information of at least one of Power Logging, Voltage, Hertz, Amperage, Total Harmonic Distortion, Power Factor, KVAR, KW, KWH and data services is communicated to an external server; and/or further comprising a lockable weatherproof cover over the at least one breaker switch; and/or wherein the at least one external power line is a set of separate power lines, each separate power line being coupled to a respective at least one breaker switch and operating independently; and/or wherein at least one of single and 3-phase power is provided to the separate power lines; and/or wherein and least one of 120V, 240V, 208V, 277V, 480V, 600V, and breaker-limited amperage is provided to the at least one external power line; and/or further comprising at least one of an electric car, solar panel, wind turbine, generator, battery storage, sub-panel, reactance bank, capacitors, inductors, chokes, grid, inverter, Wi-fi, satellite/cellular repeater, Bluetooth®, camera system, smart devices, remote wi-fi, lights, DC super charger, and charging station is connected to the at least one external power line; and/or further comprising a surge protector coupled to at least one of the first and second lines. and/or further comprising at least one of a wired base station and wireless base station, wherein the at least one external power line is coupled; and/or further comprising at least one of a package drop box, drone package drop box, and drone charging station is connected to the at least one external power line; and/or further comprising a tension tightened securing sleeve disposed about a periphery of the first face; and/or further comprising an electromagnetic lock, locking the device to a service panel when energized; and/or further comprising an extension socket having female receptacles and male tabs to mate to the first face, configured to attached to a ringed type or ringless type panel meter connection; and/or further comprising a power usage meter coupled to the second face.

In yet another aspect of the disclosed embodiments, an electrical quick meter connect device is provided, comprising: an environmental housing having a first side with electrical service panel fitting connectors, and another side with an integral power usage meter; a plurality of lines internal to the housing, coupled to the first side connectors and to the power usage meter; at least one power interrupting switch disposed on the housing and coupled to at least one set of the plurality of lines; and at least one external power line entering the housing and coupled to the at least one power interrupting switch, providing an independent external channel of power.

In yet another aspect of the disclosed embodiments, an electrical quick meter connect device is provided, comprising: an environmental housing with a first face is configured with connectors to mate directly to an electrical service panel in a meter connection manner, and a second face is configured with connectors to mate directly to a utility meter in an electrical service panel connection manner; a first and second set of lines, internal to the housing, coupled to the first face to the second face; at least one integral breaker receptacle disposed within the housing and coupled to at least one of the first and second set of lines; and at least one external power line coupled to a breaker inserted into the at least one integral breaker receptacle and exiting the housing providing at least one of external power output and external power input, wherein the quick meter connect device is configured to be inserted directly between a meter and electrical service panel to provide an external power connection.

In yet another aspect of the disclosed embodiments, the above device is provided, comprising a breaker switch coupled to the at least one integral breaker receptacle.

DETAILED DESCRIPTION

Figure 1:
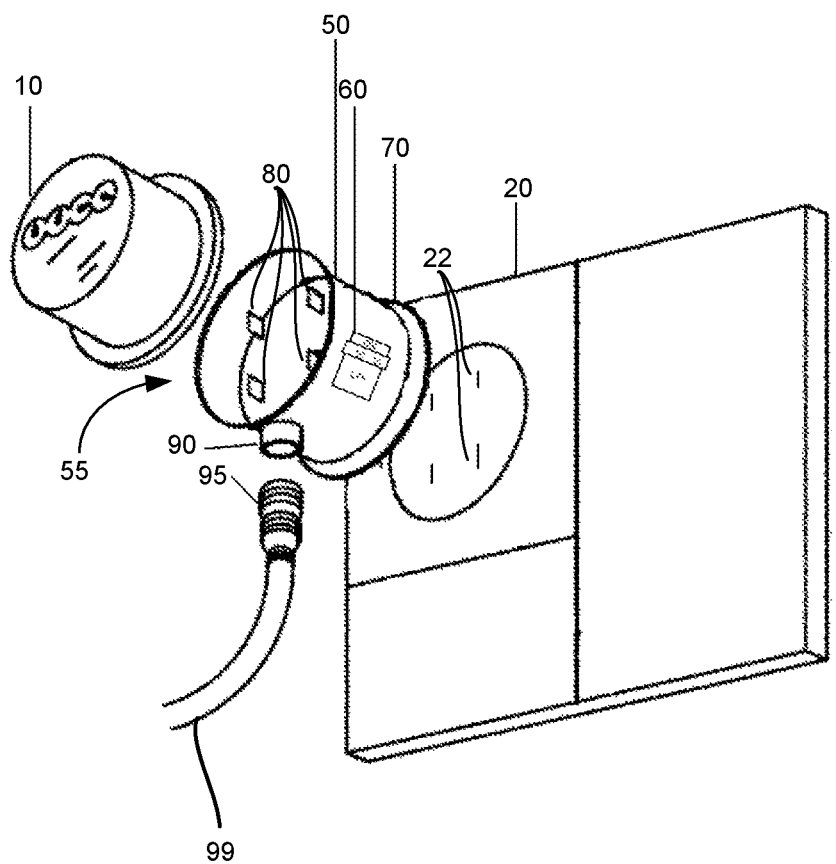
FIG. 1 is an exploded view of an exemplary Quick Meter Connect (QMC) device.

FIG. 1 is an exploded view illustration 100 of an exemplary Quick Meter Connect (QMC) device 55 for connection between an electric service utility meter 10 and electric panel/load center 20. Aspects of a utility meter 10 and electric panel 20 are well known in the art and therefore not further detailed herein, understanding that both the meter 10 and panel 20 contain contact elements, prongs, or receptacles (shown here for the panel 20 as elements 22) that physically mate to each other and provide electrical pathways between the two. The example being shown here is for a U.S. residential set-up having both 110 & 220 VAC connections. However, a non-residential configuration or international configurations can be implemented without departing from the spirit and scope of this disclosure.

The exemplary QMC device 55 has a protective housing 50 which contains on its front side corresponding front contact elements 80 that mirror the contacts 22 of the panel 20, so as to render itself electrically transparent to the meter 10. The housing 50 may be cylindrical as shown or may be of another shape, depending on implementation preference. The elements 80 are connected internally to breaker switch 60 for Over Current Protection and Ground Fault Protection, per the National Electric Codes (NEC) or other applicable safety code; and in turn connected to the panel's elements 22. Circuit breaker 60 can be part of QMC device 50 so as to be physically attached therefore non-removable and outfitted with a current limiting amperage switch based on panel and utility rating. Or circuit breaker 60 can be a commercially known brand and be removed and installed with a current limiting amperage switch based on panel and utility rating. Circuit breaker 60 will be of weatherproof design and functionality. The rear 70 of the QMC device 55 is fitted with rear contact elements (not shown) that mate to the panel's elements 22. Mounting and the electrical connection of the QMC device 55 to the panel 20 can be achieved through typical means such as used in industry for the meter 10, or via other means. Non-limiting examples for the electrical connections can be via metal jaws, insertable slots, screw-down connectors, friction, etc. Non-limiting examples for the mechanical connections can be through bolts, screws, screw-on, brackets, friction, etc. Also, a protective sleeve (not shown) may be utilized. It is understood that some electrical connection methods also provide mechanical connection functions.

QMC device 55 further includes a charging line coupler 90 that mates to charging line connector 95 at the end of conduit or charging line 99. The method for coupling can be via threaded connection, snap-in, etc. The coupler 90 can be configured for connection to various charging line brands. Coupler 90 can be a plug in style receptacle, for example, NEMA 14-50 with a weatherproof design. Coupler 90 may also be of a quick breakaway design to provide extra safety measures (e.g., magnetic, snap-in, tension, twist, etc.). The breakaway feature seen here may be replicated in any of the following embodiments, according to design preference. It is noted here that in some embodiments, coupler 90 may be first facilitated for connection to a conduit or raceway that leads to a later-connected charging line 99, if the electric vehicle charging location is not near the meter 10 location.

In operation, as the QMC device 55 allows connections to the load side of the meter 10, any current/voltage is passed from the panel 20 into the meter 10, passing through the QMC device 55 and any current/voltage used by the charging line 99 will be registered in the meter 10. Conversely, any current/voltage sourced from the charging line 99 will be reflected in the meter 10. With appropriate interconnections, the QMC device 55 can provide any phase, voltage, single or 3-phase 120/240V, 120V/208V, 277V/480V, 600V, etc. according to available input power configuration. As well as be sized for 2 and 3 pole, from 20-amps (for example) through 200/400/600 etc. amps. Thus, anywhere a utility meter is located, a QMC device 55 can be installed to provide auxiliary power/input/output. In other applications, the QMC 55 device may also be tapped to the utility side of the meter 10, therefore not registering the electric consumption by the charging system on the meter 10. By interfacing the QMC device 55 between the meter 10 and panel 20, using the pre-existing meter-to-panel connection setup, the QMC device 55 can be quickly and easily attached and detached, without requiring rewiring of the panel 20. Therefore, no damage to the home/business structure is required, and no additional circuit breaker space or circuit breaker is needed to be installed in the panel, the QMC device 55 and can be direct-shipped to a customer for customer-qualified installation or installation by a professional.

Figure 2:
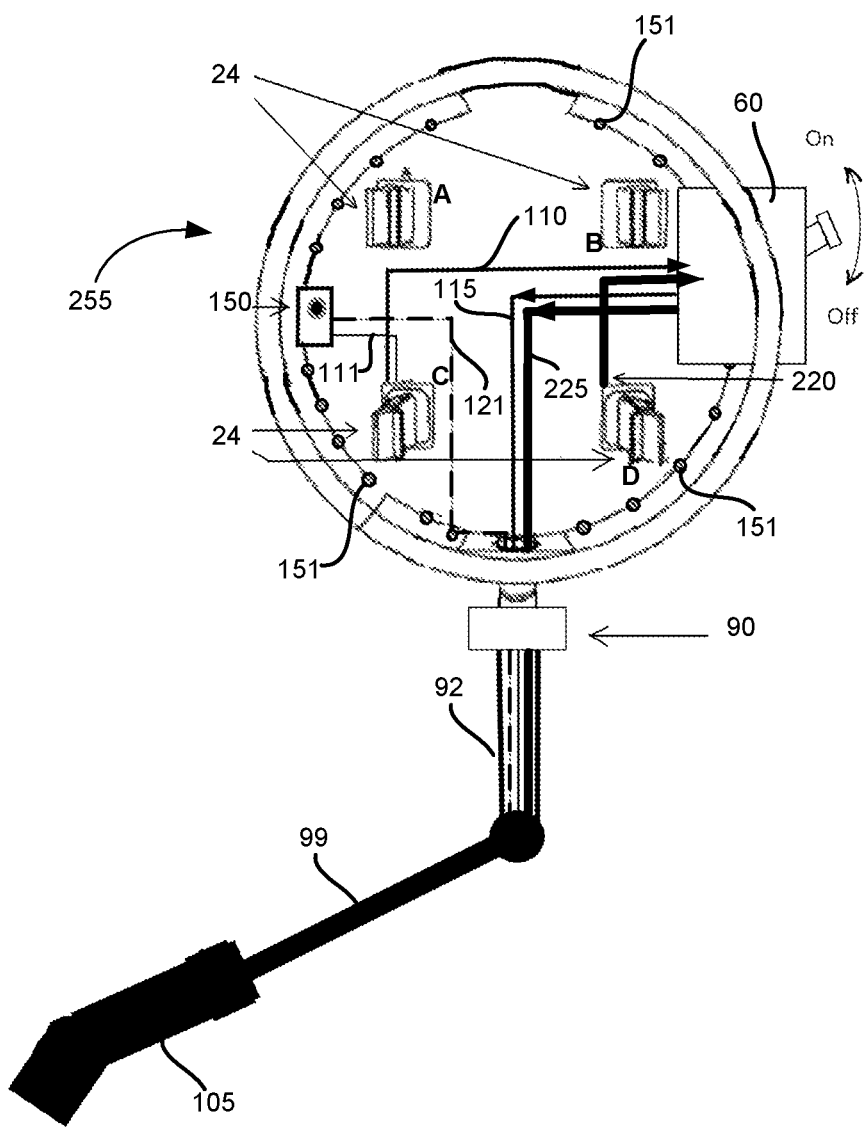
FIG. 2 is an internal wiring connection layout for an exemplary QMC device.

FIG. 2 is an internal wiring connection layout 200 for an exemplary QMC device 255. contact elements 24 (mirroring elements 80 in FIG. 2) are labeled as contacts A, B, (representing the utility side) C, and D (representing the metered side), which both connect to the supply panel load center (not shown) and represent the respective electrical voltages/currents taps. In this example, contact C and can provide 120V and is fed via line 110 into breaker 60. Output of the 120V from the breaker 60 is indicated by line 115 which leads into the coupler 90 into charging line 99. Similarly, for 240V, contact D's 120V is tapped and fed via line 220 into the breaker 60, joined with line 110 to add up to 240V and routed via line 115 to the charging line 99.

In this example, it is understood that any electricity tapped by a charger through contacts C & D would be reflected in the meter (not shown). Also, any electricity tapped by a charger through contacts A & B would not be metered. Contacts A & B are unused in this example, but may be also tapped according to the voltage/current output desired. Thus, multiple voltages can be provided to the charging line 99. Note: contacts A & B would not determine the voltage, the voltage would be determined by incoming utility supply.

A cut-away view of an optional conduit 92 is shown between the coupler 90 and charging line 99. At the end of the charging line 99 is the appropriate charger plug for the electrical vehicle being charged. Around a circumference of the exemplary QMC device 255, a standardized commercially used utility locking ring can be used or there can be an optional locking or attachment mechanism/controller 150 which energizes one or more locking points 151 disposed about the QMC device 255. For example, a magnetic or electric triggered lock or ring can be utilized. In operation, when the exemplary QMC device 255 is energized, the attachment mechanism/controller 150's "locking" prevents unauthorized opening of the QMC device 255. This provides a safety mechanism in addition to the circuit breaker 60. Energy for the attachment controller 150 can be obtained from tapping contact C's 120V, for example. Ground can be connected to the attachment controller 150 and fed via line 121 into the charging line 99. QMC device 255 may be constructed of metal and therefore grounded or constructed of plastic/polymer and conductor grounded through panel/load center.

In a simpler embodiment, the "locking" of the QMC device 255 can be achieved with a tightenable sleeve or via threaded connections, snap in, etc. In a prototype, the QMC device was designed with dimensions approximately 7 inches in diameter and 4.5 inches deep. Of course, as stated above, different dimensions and shapes may be used, is so desired.

Figure 3:
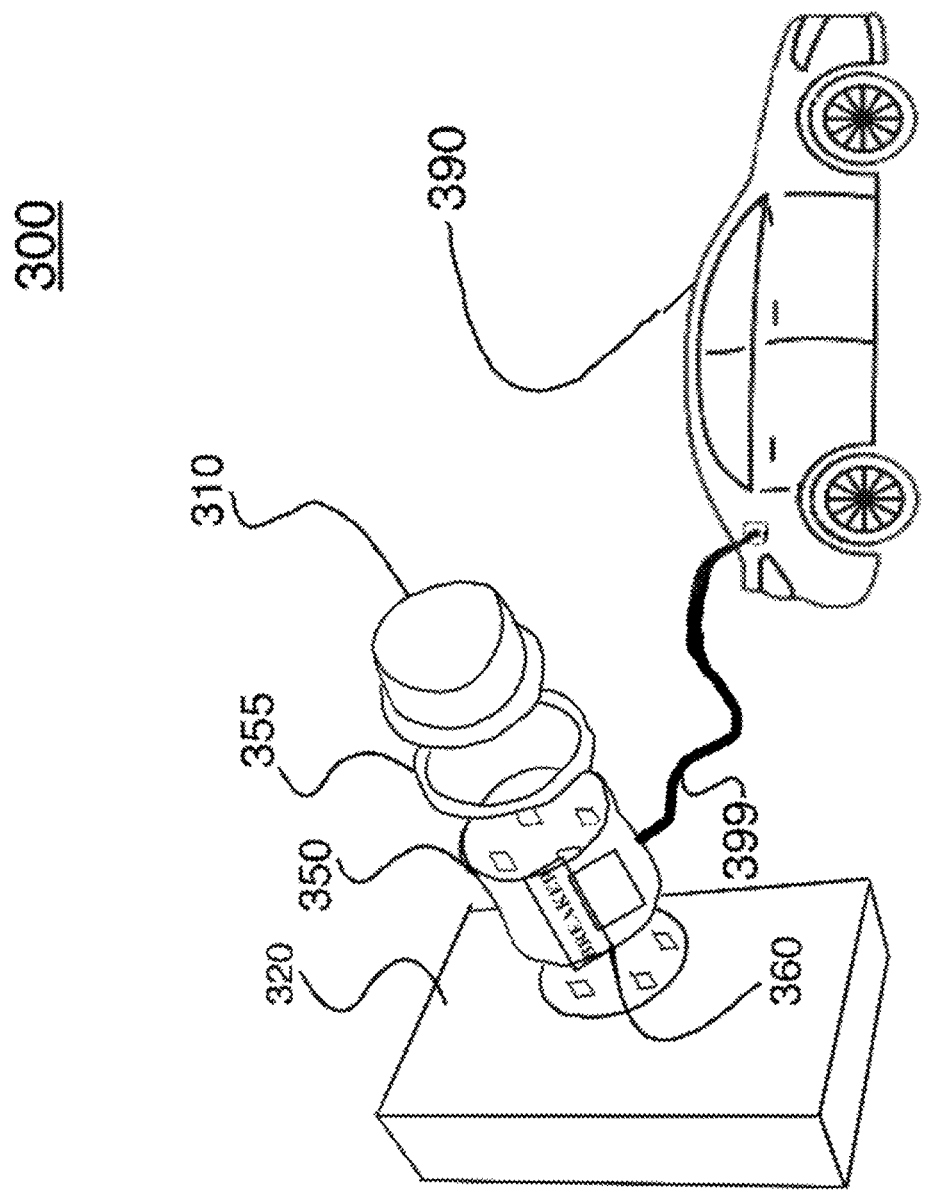
FIG. 3 is an exploded view of an exemplary QMC device connected to an electric vehicle.

FIG. 3 is an exploded view of an exemplary QMC device 350 using a screw-tightened sleeve 355 to join the meter 310. The QMC device 350 is connected to the panel 320 via breaker 360 which provides power via the QMC device 350 into charging line 399 to ultimately charge electric vehicle 390.

Figure 4A:
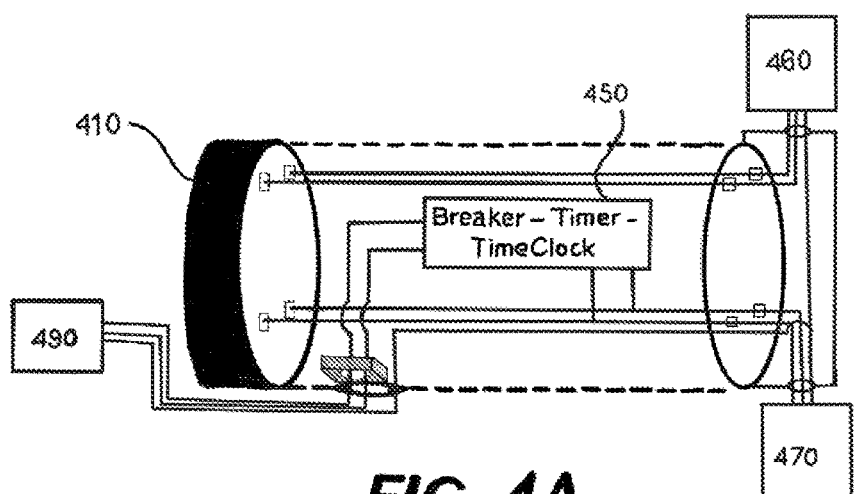
FIGS. 4A-C are block diagram illustrations of alternative exemplary embodiments.
Figure 4B:
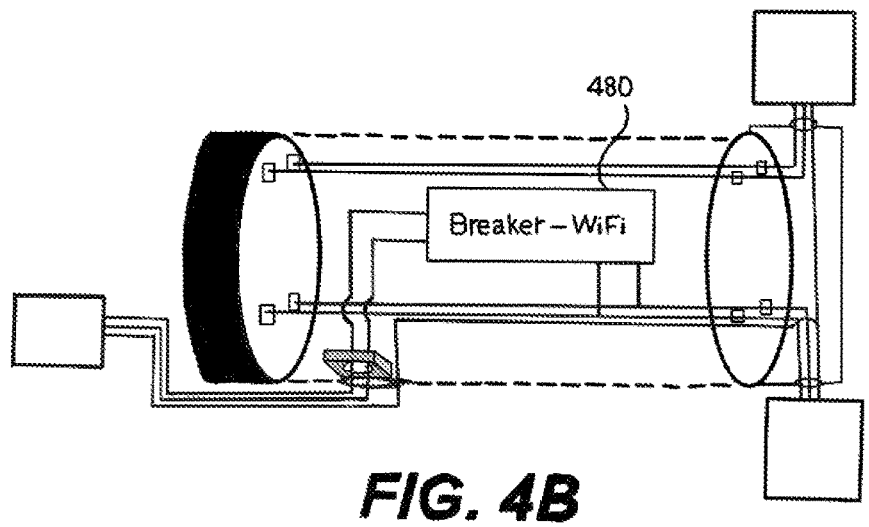
Figure 4C:
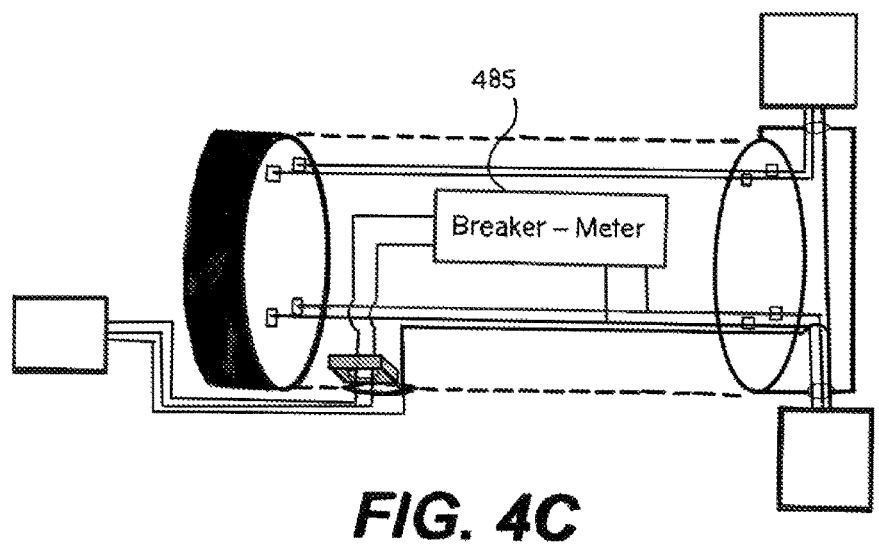

FIGS. 4A-C are block diagram illustrations of alternative exemplary embodiments. FIG. 4A is a wiring diagram displaying a Breaker-Timer-TimeClock 450 within the QMC device, so as to regulate/allow charging to electric vehicle 490 at certain times. 460 represents the electric utility supply and 470 represents the load to the electrical panel. Of course, the Timer/TimeClock portion may be separate as well as separately located from the breaker portion. FIG. 4B displays a Breaker-wireless communication capability 480 internal to the QMC device to provide separate logging of consumed charger energy. Of course, the Timer/TimeClock portion may be separate as well as separately located from the breaker portion. Alternatively, a a breaker with "analog" KWH meter combination 485 may be devised (shown here are joined to the breaker portion, but may be separate) or may be affixed to the QMC device for independent charge logging. Other possible devices and/or systems may be implemented within the "inner" portion 450, 480, 485, for example, an CPU or automatic device could provide automatic transfer of power to allow remote switching of the breakers, if so desired. Moreover, a surge protection circuit may be implemented, whereby transients entering the panel can be filtered to avoid damage to house's devices. Further, a Ground and Arc Fault Protection circuit may be implemented, providing system wide, whole house/commercial/industrial facility protection.

In alternative embodiments, the exact positioning of the circuit breaker and/or charger connection may be altered, according to design preference. Further, the rotational positioning of the QMC device may be adjustable so as to allow the QMC device to be rotated clockwise or counter clockwise as to allow the coupler and circuit breaker to be in the best possible location for use.

Figure 5:
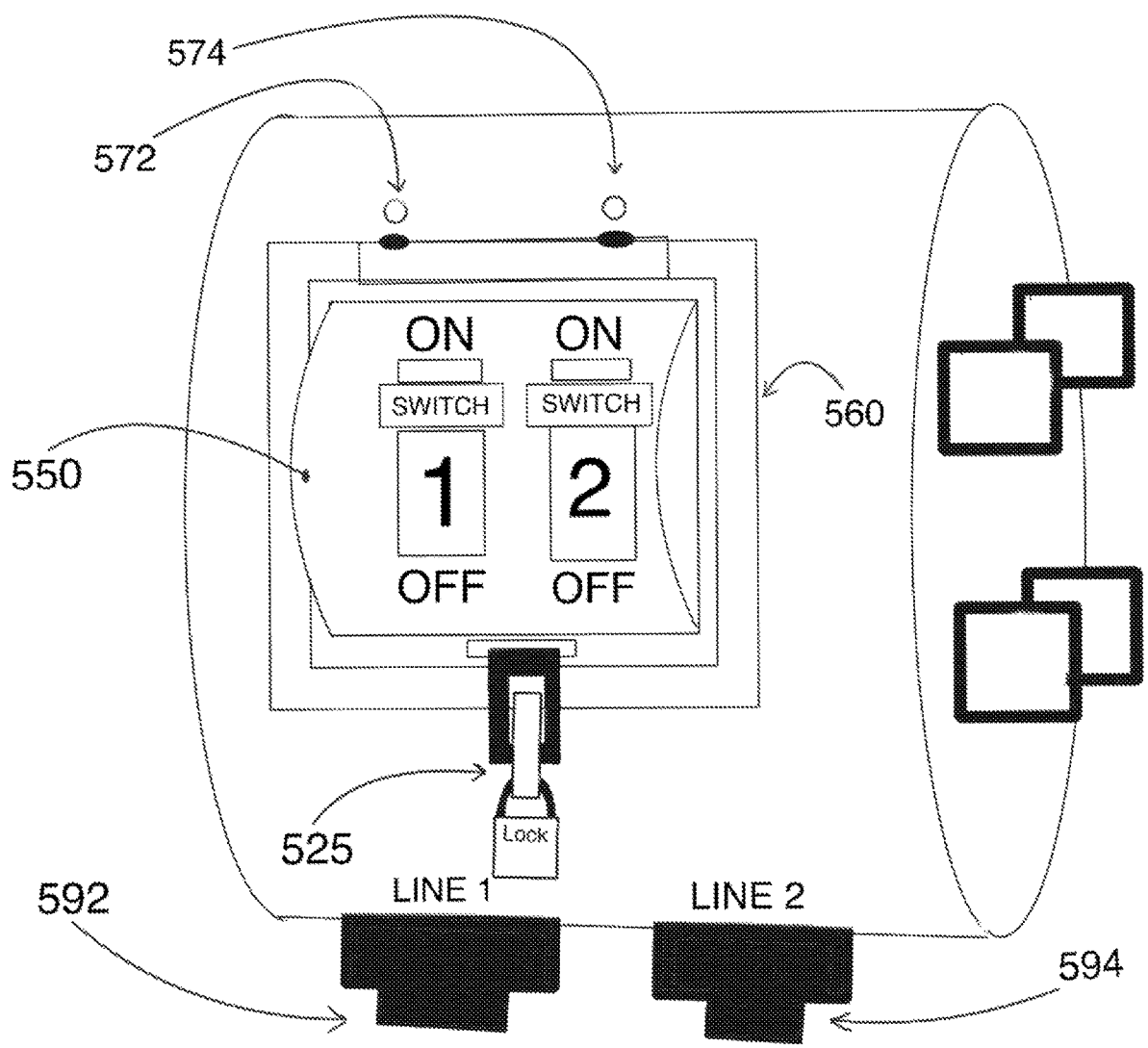
FIG. 5 is block diagram illustrating another exemplary QMC embodiment, wherein more than one breakers are situated on the side of the QMC device.

FIG. 5 is block diagram illustrating another exemplary QMC embodiment 500, and exposed panel connectors 580, wherein more than one breakers 560 are situated on the side of the QMC device 500. Each breaker 560 is connected to line-out couplers (or lines) 592, 594 providing power to/from external loads/sources (not shown). In some embodiments, the line-out couplers 592, 594 may be of a breakaway design, allowing a connected cable (not shown) to separate upon a given tension/force, either by mechanical limit, twist off, magnetic or otherwise. A cover 550 is used to provide environmental protection of the breakers 560s, wherein the cover 550 maybe transparent, if so desired, and also lockable 525 via a latch or other appropriate mechanism. Optional power/breaker status indicators (e.g., lights) may be internal to or external (as shown) to the cover 550. This embodiment illustrates a design accommodating multiple breakers-to-lines. It should be appreciated that with a multi-breaker QMC, one or more of the additional breakers may be parallel-connected to the internal power conduits, with different current/voltage values for the respective output lines, if so desired. Moreover, the one or more additional breakers may be serial-connected to a "parent" breaker, thus a tree of output lines may be controlled by a single parent breaker and downstream lines lower current-controlled with a lesser rated current breaker. As can be seen, various modifications and configurations are possible with a multi-breaker system.

Figure 6A:
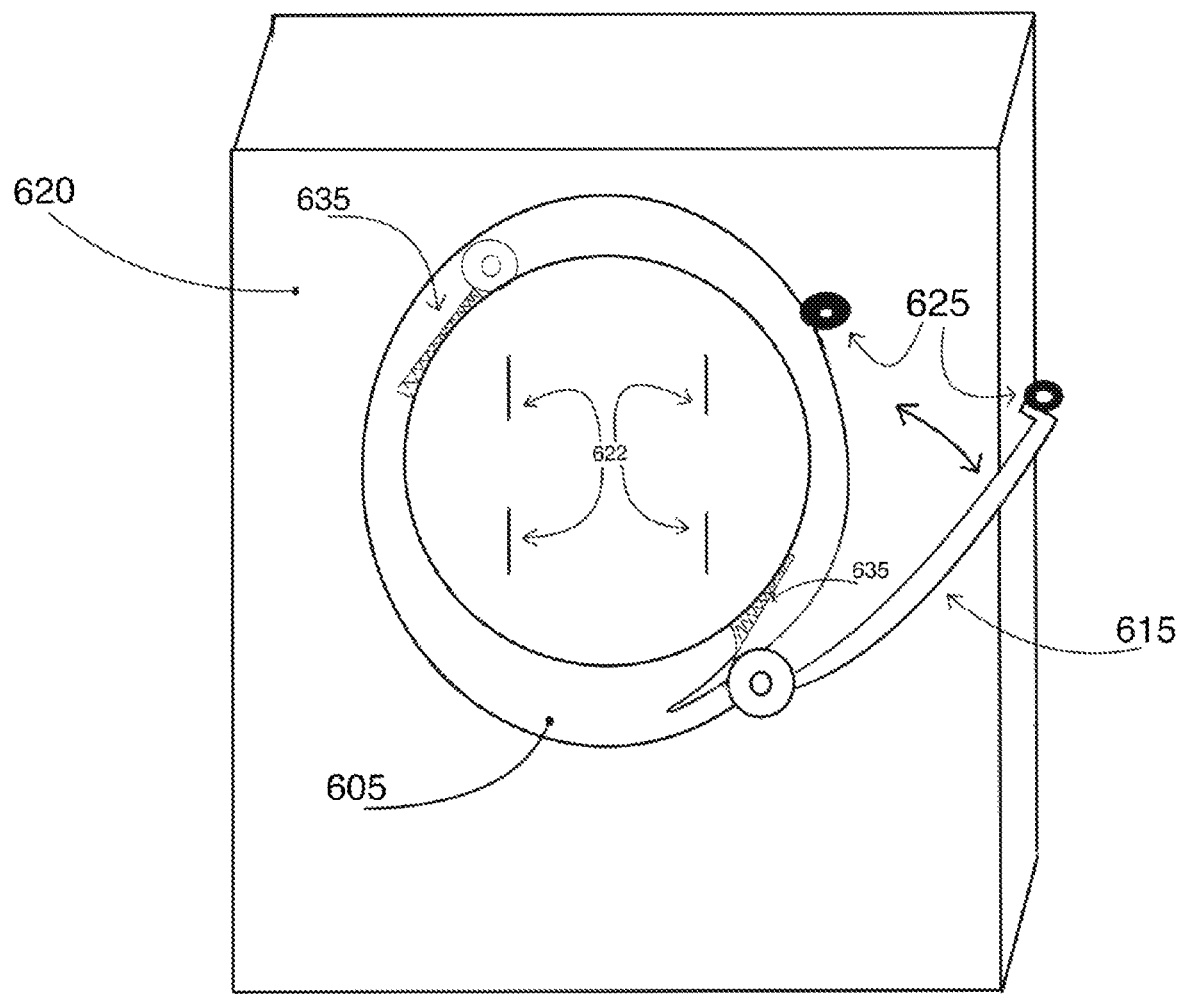
FIG. 6A is a simplified illustration of a main panel having a different QMC-to-Panel attachment paradigm via a locking "compression" sleeve.

FIG. 6A is a simplified illustration 600 of a main panel 620 having a different QMC-to-Panel attachment paradigm wherein the QMC's attachment to the panel 620 is facilitated via a locking "compression" sleeve 605. The QMC (not shown) is inserted into the panel's receptacles 622 and the sleeve's 605 arm 615 is moved counterclockwise (or alternatively in other designs, CW) to tighten the sleeve 605 around a base of the QMC. If the sleeve 605 and base of the QMC are metal, then a grounding path via this approach can be obtained between the QMC and the panel 620. In some embodiments, one or more teeth or other gripping means 635 may be utilized to assist in the securing. Locking or securing the arm 615 can be achieved via overlapping rings 625 on the arm 615 and on the sleeve 605 or any other suitable location on/about the panel 620. It should be appreciated that this illustration utilizes a sleeve 605 and tightening arm 615 to provide compression about the QMC, however, other similar means wherein the sleeve 605 is not encompassing nor the arm 625 as long are envisioned. For example, the arm 615 may be replaced with a flip-clip, or engage a section of the QMC to "latch" it to the panel 620. Therefore, other possible variations are understood to be within the scope of this disclosure.

Figure 6B:
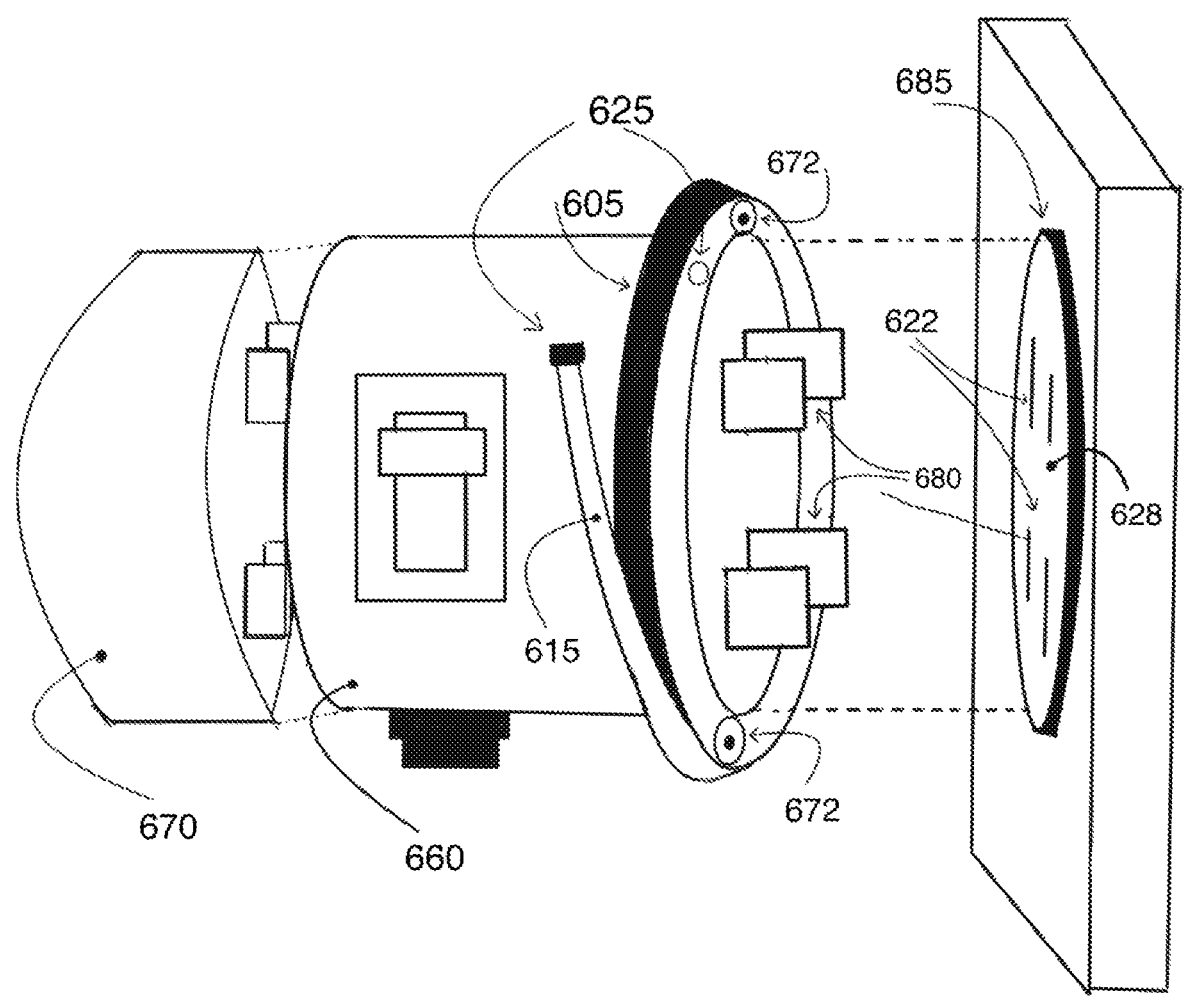
FIG. 6B is a side-view illustration showing an implementation of the attachment paradigm of FIG. 6A

FIG. 6B is a side-view illustration showing an implementation of the attachment paradigm of FIG. 6A with a QMC 660 (and attendant meter 670) prior to attachment to the panel 620. QMC tabs 680 are inserted into the panel's receptacles 622, with the sleeve 605 fitted over the QMC's end and also over a lip 685 of the panel's receptacle face 628. The sleeve 605 may be integrally attached to the QMC 660 (e.g., a part of the QMC 660), or may be a separate element that is slipped on. One or more sleeve pivot joints 672 can assist in providing the needed compression of the sleeve 605 to attach to the lip 685. Depending on implementation design, the exemplary QMC 660 may be configured without a grounding surface contact. In some designs, the QMC 660 may be of a shape and size to attach to a ring meter socket or ringless meter socket service panels.

Figure 7:
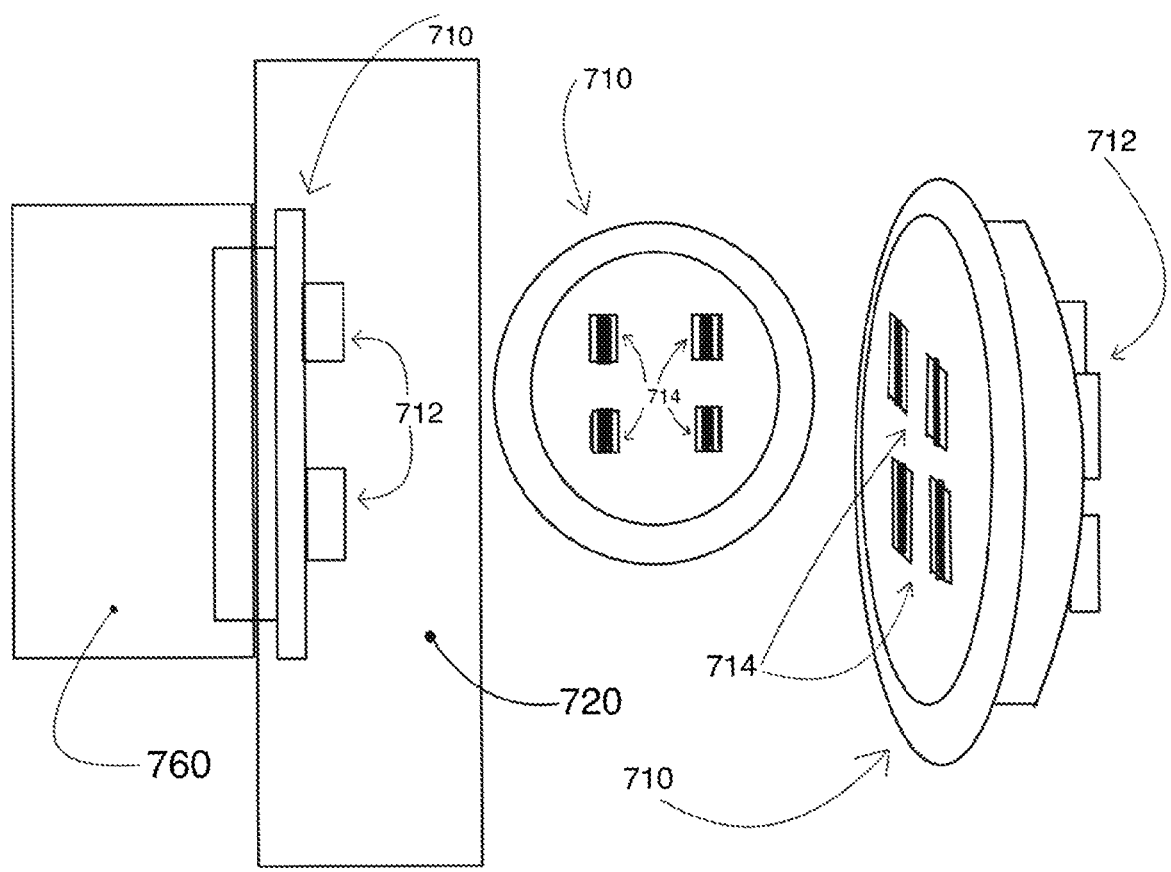
FIG. 7 is an illustration of various views of another attachment mechanism showing a ringless QMC meter extension.

FIG. 7 is an illustration 700 of various views of another attachment mechanism showing a ringless QMC meter extension 710. Here, QMC meter extension (aka—QMC-me) 710 provides, if needed, an ability to "extend" the QMC-to-panel 720 configuration through an extension 710 having male tabs 712 and corresponding female receptacles 714. For example, if the face of the panel 720 is such that the QMC 760 is not able to "latch" onto or be secured to the panel face, then the QMC-me 710 will provide the needed structure for latching. For example, in the scenario seen in FIG. 6B, if the panel does not have a lip 685 (or its diameter is non-matching), the outer surface of the QMC-me 710 can provide the desired surface to allow attachment.

Figure 8:
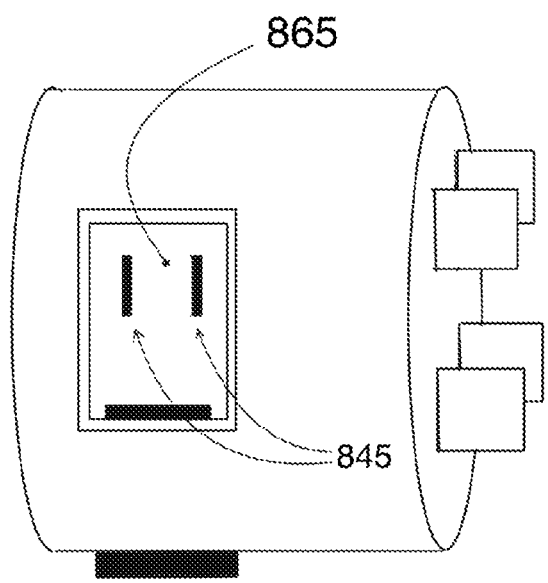
FIG. 8 is an illustration of an exemplary embodiment of a breakerless QMC, wherein the externally accessible breaker (not shown) is not yet installed.

FIG. 8 is an illustration of an exemplary embodiment of a breakerless QMC 800, wherein the externally accessible breaker (not shown) is not yet installed. It is not uncommon in the electrical industry for a breaker to fail or become compromised, or a breaker is switched out for a lower/higher value. This embodiment provides an easy way to replace such a breaker without having to replace the entire QMC 800.

Of course, while FIG. 8 shows only one breakerless slot 865, the QMC 800 may have several slots, enabling multiple breakers to be installed. Over-current-protection, whether 2-pole and 3-pole circuit Breakers may be installed, wherein the system may be permit interchangeability. One or more contacts 845 for a breaker installation (and securing) are shown and are understood to be self-explanatory. This embodiment may include one or more additional features shown in other embodiments as described herein.

Figure 9A:
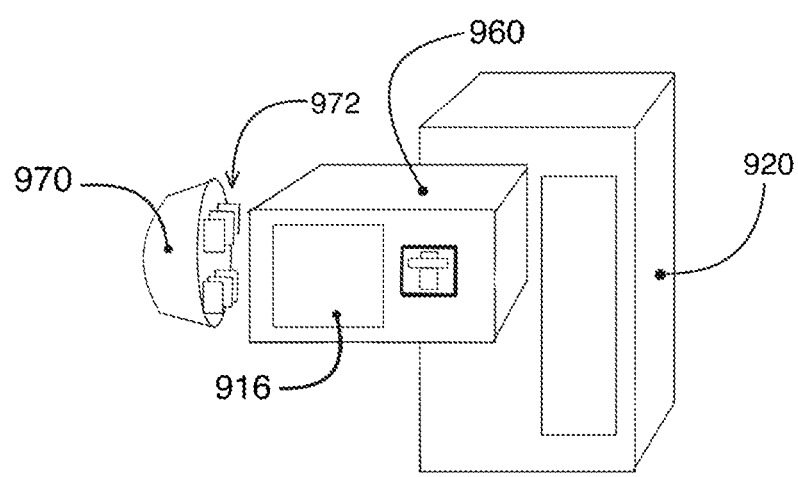
FIG. 9A is an illustration of an offset meter QMC.

FIG. 9A is an illustration 933 of an offset meter QMC 960 prior to installation. In some circumstances it may be desirable to have meter 970 positioned offset from the panel 920. That is, the QMC 960 may be designed to reduce it length to minimize "stick out" from the panel 920. This configuration creates more room inside the QMC 960 for any number of internal selected components. In this example, the meter 970 is 90 degrees offset from the face of the panel 920. To facilitate this, an offset meter QMC 960 is contemplated that allows connection to the panel 920 and lateral positioning of the meter 970. As can be seen here, this example shows a 3-Phase 120/208V and/or 277/480 meter 970 arrangement due to the more than four tabs 972 on meter 970. Based on this example, it is expressly understood that other power connections, voltage choices, orientations and shapes to provide an offset meter QMC are possible. For example, one that provides a "bottom" or "top" mount meter 970, or other angles. Also, the QMC itself need not be rectangularly shaped as shown here. In this and other embodiments, due to the increased "room" inside of the QMC, additional components and circuitry 916 can be accommodated. Non-limiting examples being CPUs, automatic transfer switches/contacts, wireless systems, inverters, passive electrical devices as capacitors, inductors, chokes, etc. If sufficient capacitors are utilized, the output voltage can be increased, as well as reducing charge time.

Figure 9B:
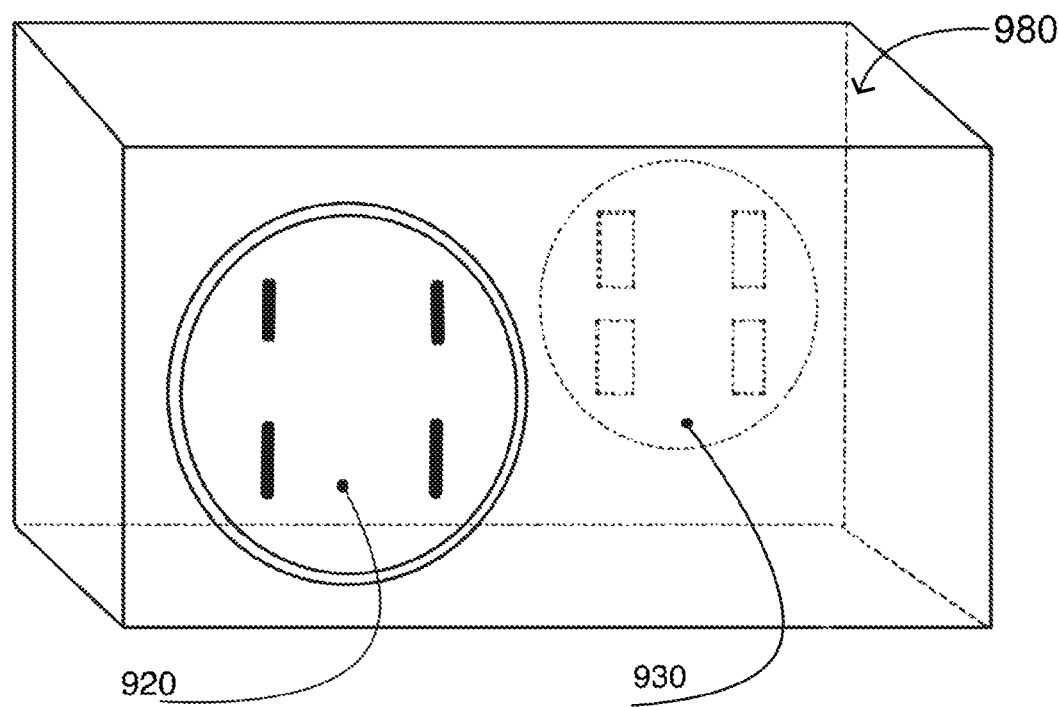
FIG. 9B is an illustration of another offset meter QMC, where the meter mount point is on the left side, while the QMC panel mount point is on the right interior side.

FIG. 9B is an illustration 966 of another offset meter QMC 980, where the meter (not shown) mount point 920 is on the left side, while the QMC 980 panel mount point 930 is on the right interior side (shown here in dashed lines). Therefore, different sides, or faces, or ends of the QMC 980 can be designed with the appropriate connections. As stated above, various other orientations, locations of contacts, shapes are understood to be within the purview of this disclosure.

Figure 9C:
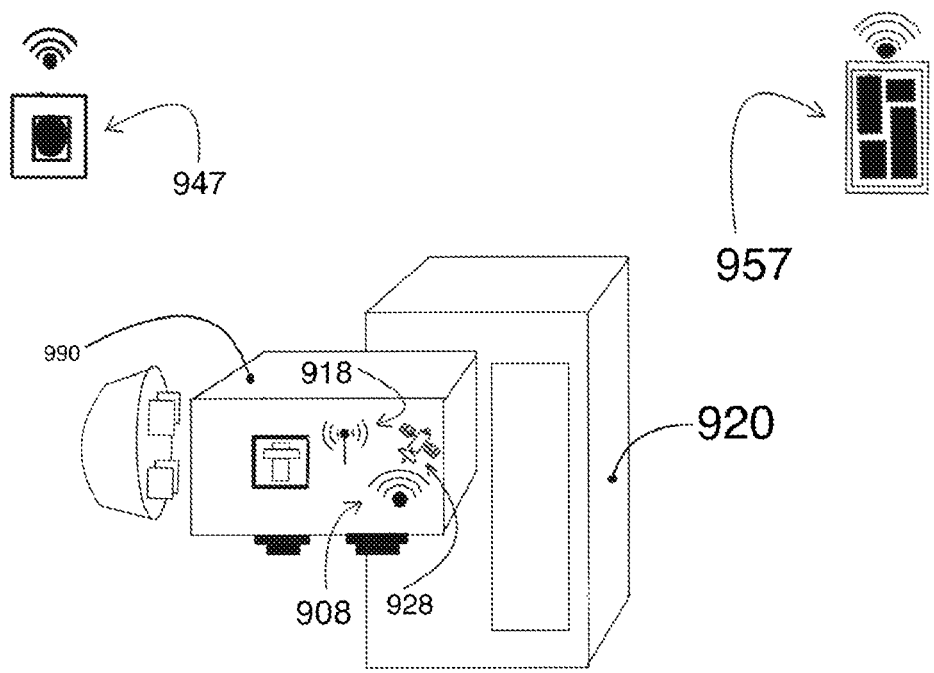
FIG. 9C is an illustration demonstrating an offset QMC with Wi-Fi capability and/or cellular capability.

FIG. 9C is an illustration 999 demonstrating an offset QMC 990 with Wi-Fi capability 908 and/or cellular capability 918 and/or satellite capability 928. Such add-ons allow the QMC 990 to provide health and status information via the wireless systems 908, 918, 928 as well as allow connection to wireless cameras 947, external devices 957 such as weather sensors, temp sensors, and any other devices. Non-limiting examples of possible provided information are: Power Logging, Voltage, Amperage, Total Harmonic Distortion, Power Factor, KVAR, KW, KWH, etc. This embodiment enables monitoring of the panel, if so desired, as well as any remotely connected device. With wireless communication made available, the location of the power panel/QMC can be relayed to a remote system for geolocation, power logging, data management and distribution. For example, charging of a connected load (EV) may be switched off, changed by a user via a smartphone app, or based on current power costs. Or if a multi-breaker QMC is utilized, switching between breakers may be performed, as well as connecting/disconnecting devices and sources/loads to the QMC. Various non-limiting possible other examples are detailed below.

Figure 10:
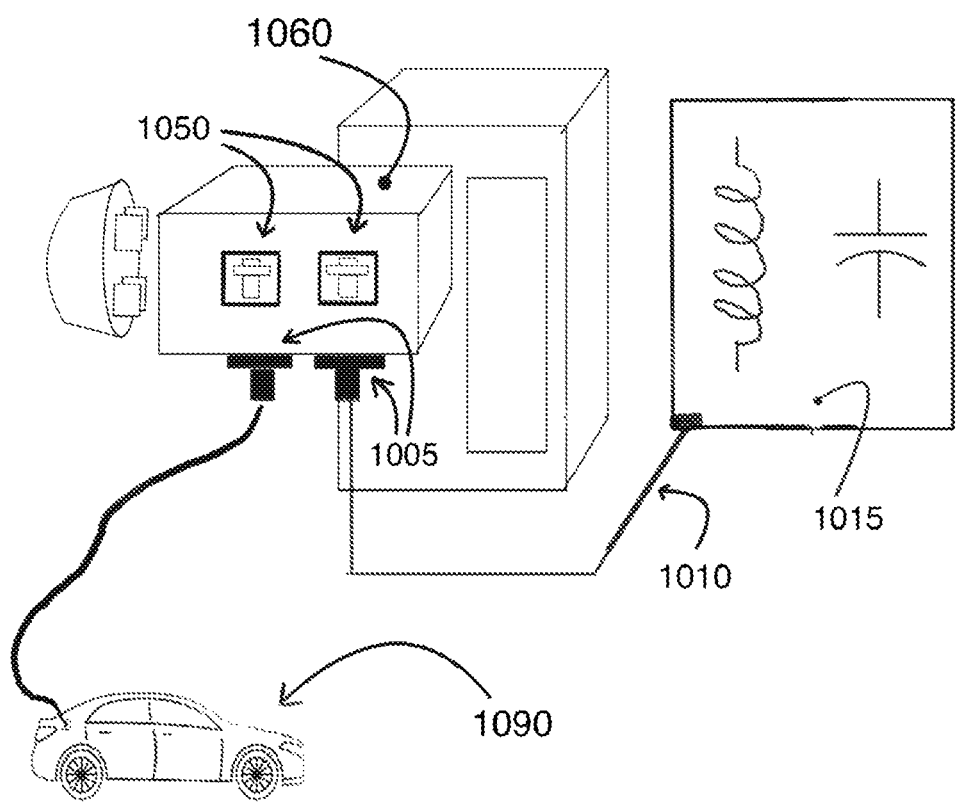
FIG. 10 is an illustration of an exemplary QMC having multiple breakers coupled to multiple output lines, one of which connects to an EV and the other to a reactance bank.

FIG. 10 is an illustration 1000 of an exemplary QMC 1060 (shown here offset for ease of illustration only) having multiple breakers 1050 coupled to multiple output lines 1005, one of which connects to an EV and the other 1010 to a reactance bank 1015. The reactance bank 1015 supplies needed inductance or capacitance to offset the reactive component of the power being consumed, for more efficient power usage. Such compensation systems are commonly seen in large industry but may be valuable for smaller scale users, given the type of loads being used today. This embodiment illustrates the ability to allow operations other than "charging" the EV 1090 to be performed via the use of a multi-line QMC 1060.

Figure 11:
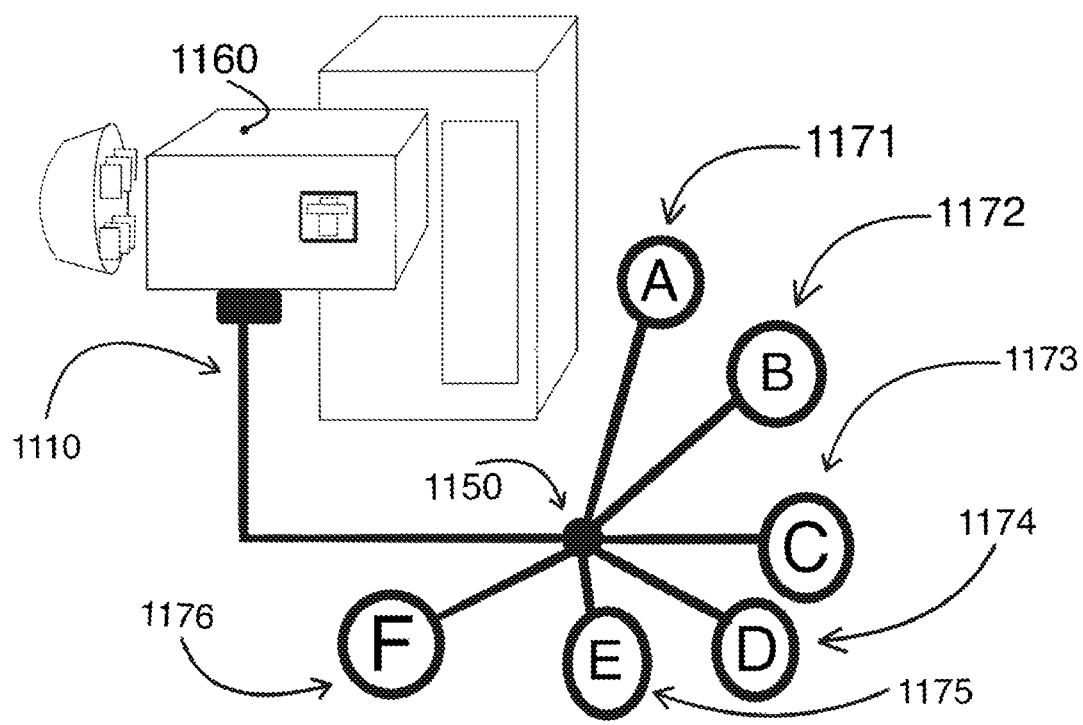
FIG. 11 is a simplified diagram illustrating the ability of a QMC to be connected via line to multiple different loads and/or sources, through a common junction or base.

FIG. 11 is a simplified diagram 1100 illustrating the ability of a QMC 1160 (optionally offset) to be connected via line 1110 to multiple different loads and/or sources 1171-1176, with or without common junction, base, charging station 1150. While FIG. 11 shows a single breaker device, it is understood that a multiple breaker QMC can be utilized, if so desired to provide parallel paths to different loads/sources, etc. With the ability to power multiple "downstream" devices and/or receive power from multiple "upstream" devices, 1171-1176 can comprise and one or more loads/sources. Non-limiting examples are a non-local charging station, package drop receptacle, drone package drop, drone charging garage, solar panels, generators, batteries, reactance banks, inductors, capacitors, chokes, vehicles, lights, and so forth. Moreover, in various embodiments shown here, the power line or lines to the base 1150 may be underground, if so desired.

Figure 12:
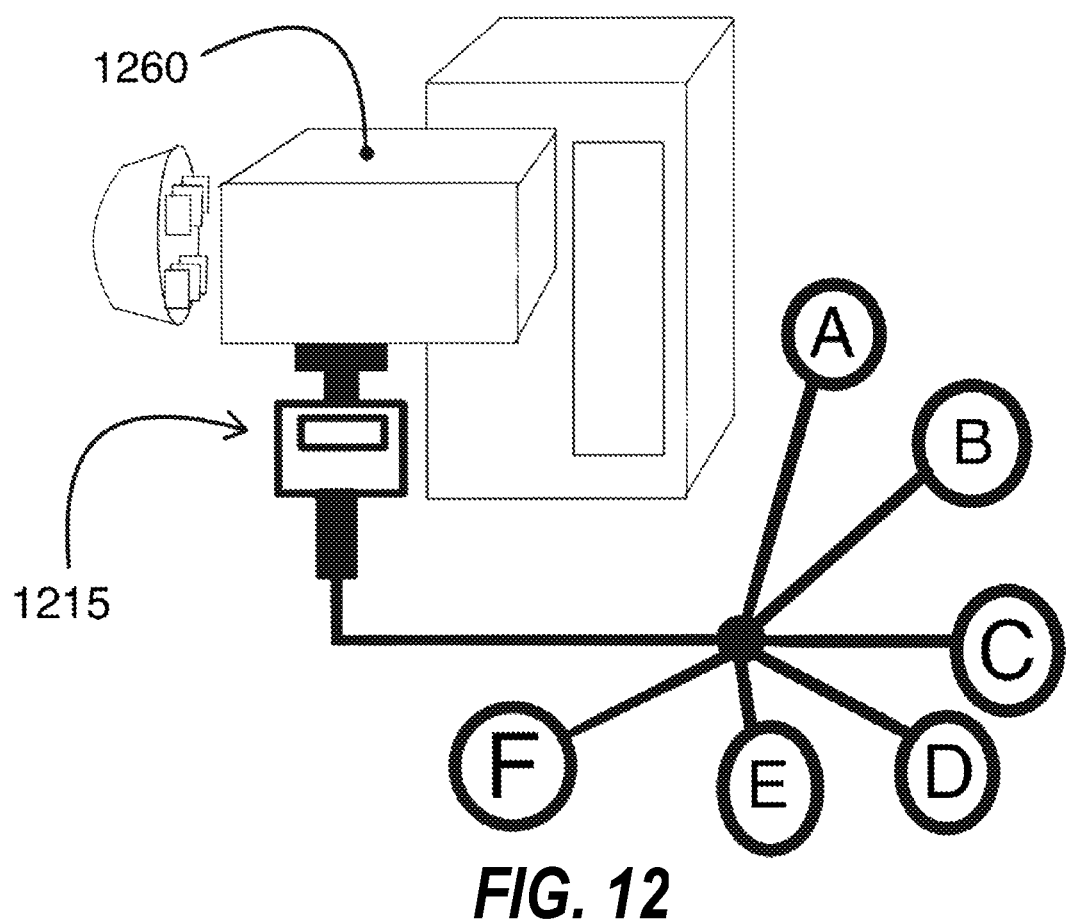
FIG. 12 is an example of a modification of the embodiment of FIG. 11, wherein a shutoff or disconnect (optionally with monitoring capabilities) is positioned external to or downstream from the QMC.

FIG. 12 is an example 1200 of a modification of the embodiment of FIG. 11, wherein a shutoff or disconnect (optionally with monitoring capabilities 1215) is positioned external to or downstream from the QMC 1260. This embodiment allows a user to control QMC-provided power remotely, when not in the immediate vicinity of the QMC 1260. As a non-limiting example, a disconnect or control system may be situated at a terminal or station where the EV (or other load/source) is located. While FIG. 12 shows a single breaker device, it is understood that a multiple breaker QMC can be utilized, if so desired to provide alternate power paths, etc.

Figure 13:
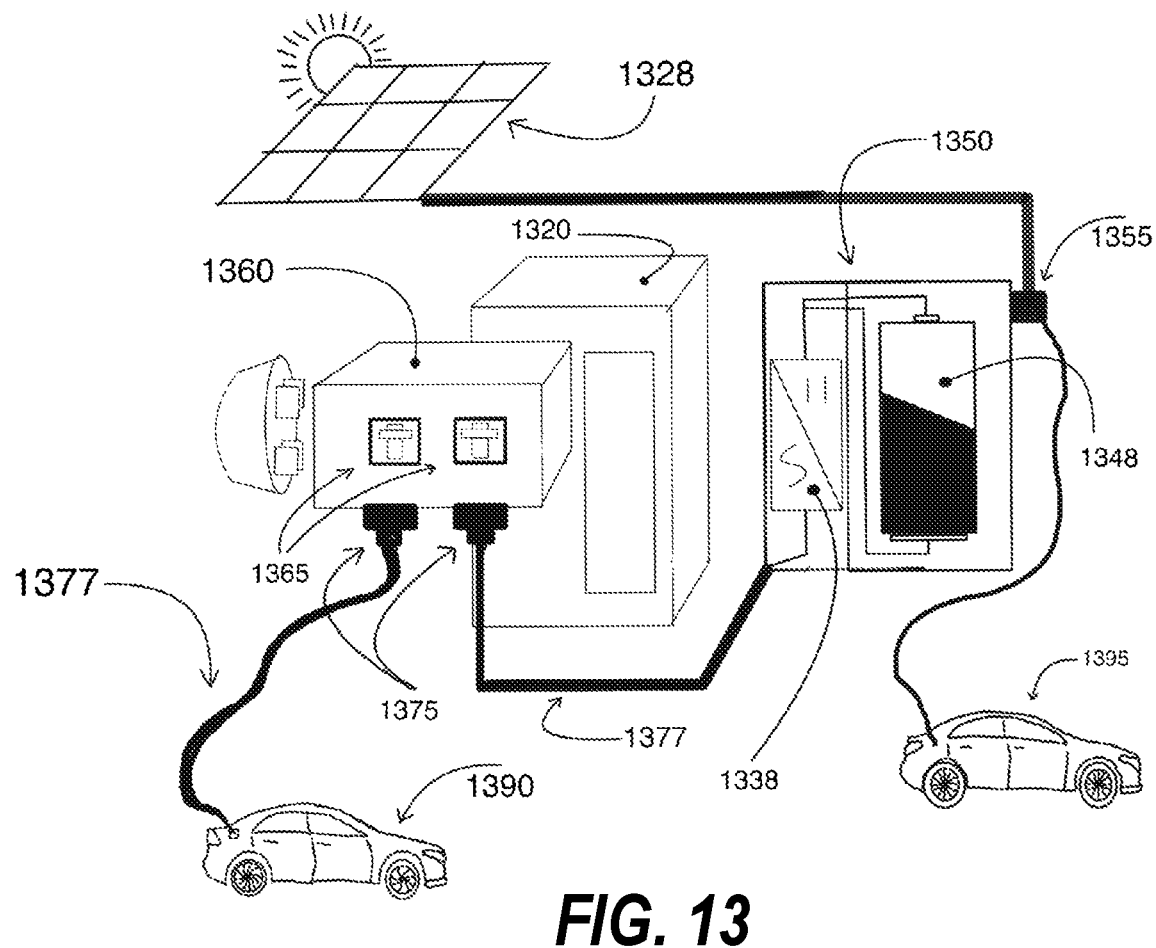
FIG. 13 is an illustration of a multi-use QMC, having a plurality of breakers and attendant output/input lines, connected to respective loads and sources.

FIG. 13 is an illustration 1300 of a multi-use QMC 1360, having a plurality of breakers 1365 and attendant output/input lines 1375, connected to respective loads and sources. This example illustrates the utility of a multi-breaker/line QMC 1360, wherein one line 1377 can be used to channel power from (to) the panel 1320 to charge (discharge) an EV 1390. Secondary line 1377 can be channeled to a plurality of other power sources/loads through power center 1350. The power center 1350 can contain requisite power equipment such as high voltage DC inverter 1338 and/or battery 1348, which are connected to various sources/loads via one or more junction connections 1355. Junction 1355 allows power to come from solar array 1328 and also have that renewable power channeled to $2^{nd}$ vehicle 1395, if so desired. Alternatively, solar array 1328's power can be inverted via inverter 1338 and directed back to the QMC 1360 to provide power into panel 1320. Or, it may be stored in battery 1348 and or discharged at a high output DC voltage for a faster EV charge. Of course, other devices or systems, may be connected such as Wind Turbine, fuel-based Generator, sub-grid, DC super charger, etc.

The various interchanges and connections for moving power between different sources and loads, storing power, altering power, etc. are well within the ability of one of ordinary skill and therefore are understood to be self-explanatory in view of the embodiment shown here. For example, more than two breakers or the breakers may have different voltages (one being 110V, the other 240V), other types of loads/sources, etc. As seen in the embodiments of FIGS. 11 and 12, many other downstream connections may be made (star, series, parallel, etc.) and therefore various modifications to this embodiment are understood to be within the scope of this disclosure. Of course, the exemplary QMC 1360 need not be offset or of the shape shown.

Figure 14:
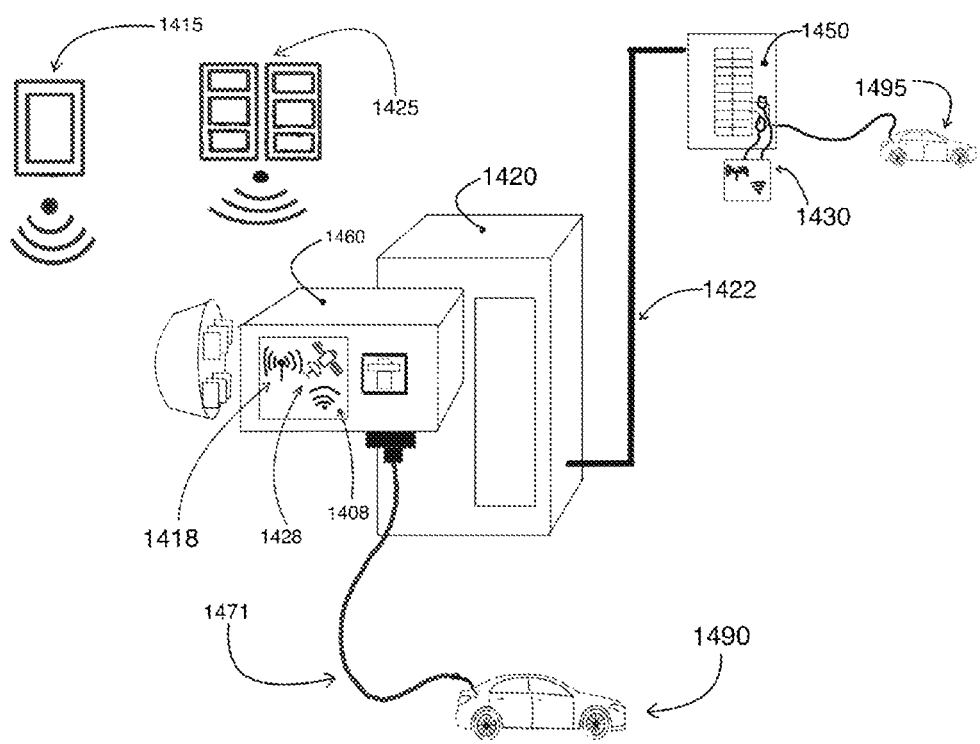
FIG. 14 is an illustration of an embodiment having a combination of features of various embodiments.

FIG. 14 is an illustration 1400 having a combination of features of various embodiments. Here, Wi-Fi 1408 and/or cellular 1418 and/or satellite 1428 capabilities are built into or "connected" to QMC 1460, with one or more input/output lines 1471 connected to an EV or source 1490. By virtue of the wireless communication ability of the QMC 1460, control and/or monitoring of a remote non-QMC "station" can be accomplished. For example, remotely located station (sub-panel) 1450 being connected 1422 to main panel 1420 may have remote EM systems 1430 communicating with QMC 1460's EM systems (1408, 1418, 1428). This remote station 1450 may be monitored by QMC 1460 and power input/output to/from remote EV 1495 can be processed or forwarded by QMC 1460, for example sent to a user's smartphone 1415 (e.g., EV 1495 is fully charged, as sub-panel 1450 is no longer drawing power, etc.), a server 1425, and so forth. Thus, someone "local" to the QMC 1460 may obtain the remote information, either by direct communication or processed by via server 1425. Further, while power is provided from the QMC 1460 to the remote station 1450 (powering a connected device(s)), it is possible for QMC 1460 to shut power off in the remote station 1450 (or to a connected device(s)) based on information received from various Wi-Fi/cellular/satellite interactions. For example, a remote EM system 1430 may indicate to QMC 1460's Wi-Fi/cellular/satellite systems (1408, 1418, 1428) that a sub-panel connected device no longer needs charging. And QMC 1460 may act accordingly. Additionally, while the above illustration shows the remote EM system 1430 as a QMC-related system, the remote EM system 1430 may operate as a Wi-Fi booster or Cell repeating station or satellite link, having no direct relation to the main QMC 1460, if so desired.

Figure 15:
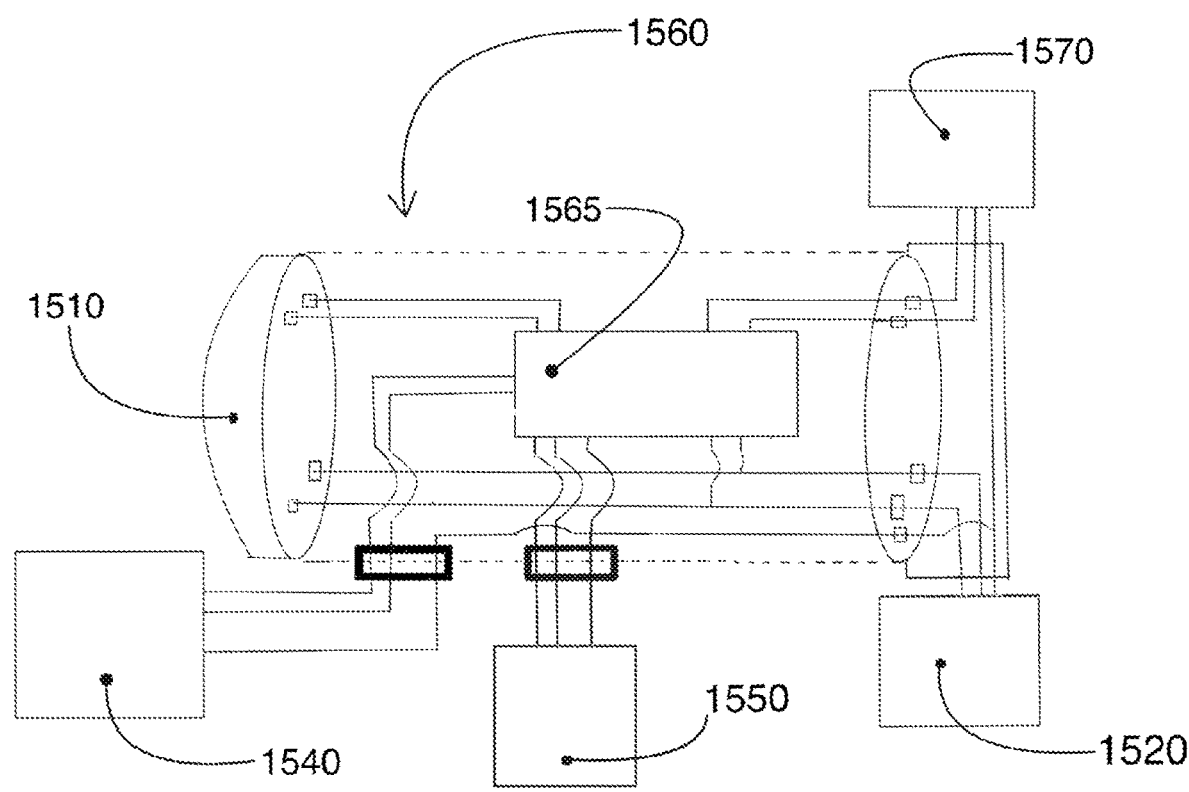
FIG. 15 is a schematic illustration of a single-phase, 2-breaker QMC, showing one set of possible connections to facilitate powering of first load and second load.

FIG. 15 is a schematic illustration 1500 of a single-phase, 2-breaker QMC 1560, showing one set of possible connections to facilitate powering of first load 1540 and second load 1550. Meter 1510 is coupled to one side of QMC 1560 and the opposite side is coupled to a service panel bringing in line power 1520 to service the home (building, factory, etc.) 1570. Breakers, circuitry, add-ons, etc. are represented as 1565. Of course, one or more of loads 1540, 1550 may be sources and more than two breakers may be implemented by adding additional connections in like manner.

Figure 16:
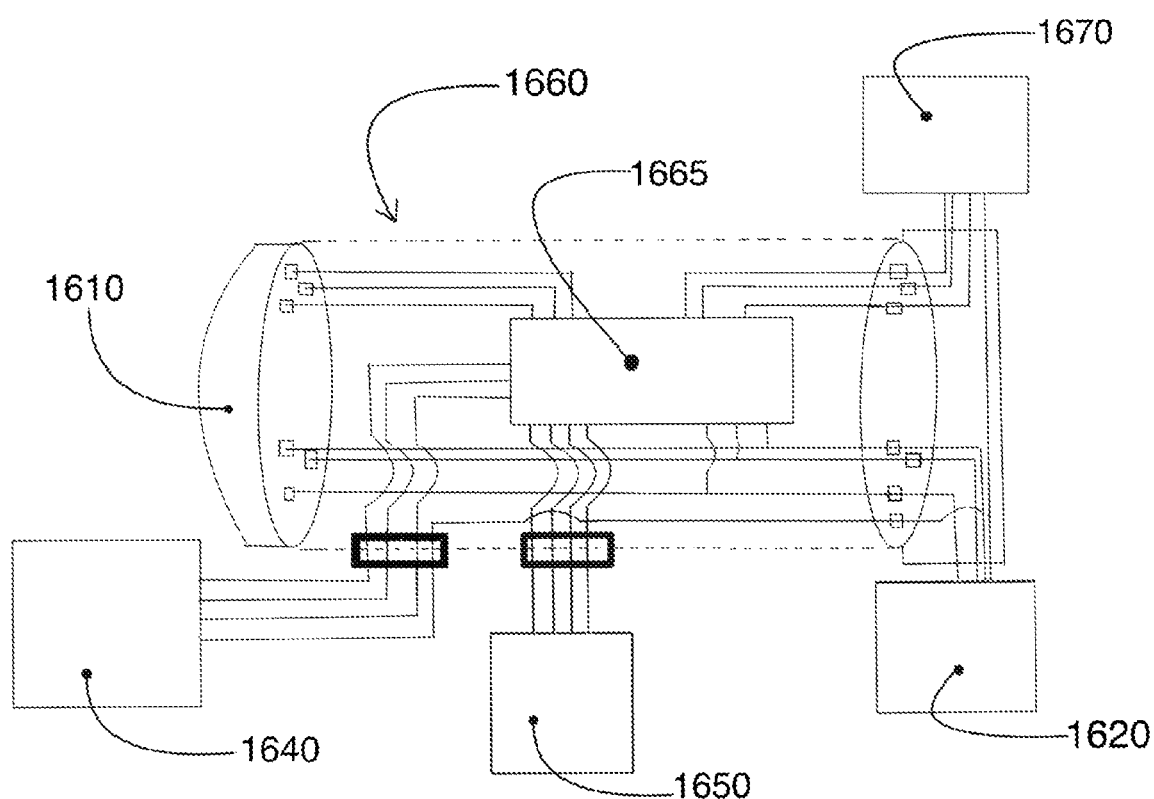
FIG. 16 is a schematic illustration of a three-phase, 2-breaker QMC, showing one set of possible connections to facilitate powering of first load and second load.

FIG. 16 is a schematic illustration 1600 of a three-phase, 2-breaker QMC 1660, showing one set of possible connections to facilitate powering of first load 1640 and second load 1650. Meter 1610 is coupled to one side of QMC 1660 and the opposite side is coupled to a service panel bringing in line power 1620 to service the home (building, factory, etc.) 1670. Breakers, circuitry, add-ons, etc. are represented as 1665. Of course, one or more of loads 1640, 1650 may be sources and more than two breakers may be implemented by adding additional connections in like manner.

Figure 17:
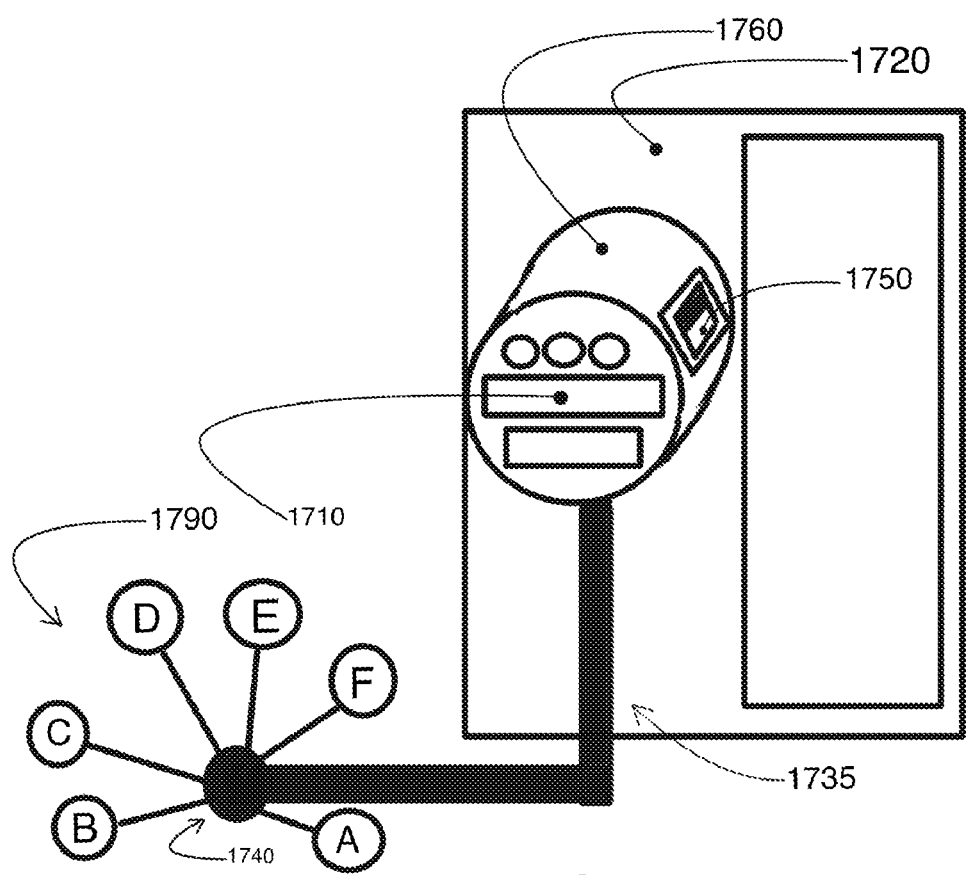
FIG. 17 is an illustration of an all-in-one QMC, with a built-in meter installed onto a panel.

FIG. 17 is an illustration 1700 of an all-in-one QMC 1760, with a built-in meter 1710 installed onto a panel 1720. This example envisions an embodiment where the QMC and the electric utility meter are integrally designed as a single unit. The externally accessible switch (breaker) 1750 is shown in this embodiment with device-connecting cable 1735 from the QMC body that facilitates power to/from a remote station 1740 which can act as a hub or connection point for various other devices 1790 (A-F). Modifications to this all-in-one embodiment can be made according to the different designs and configurations described in the prior embodiments.

Figure 18:
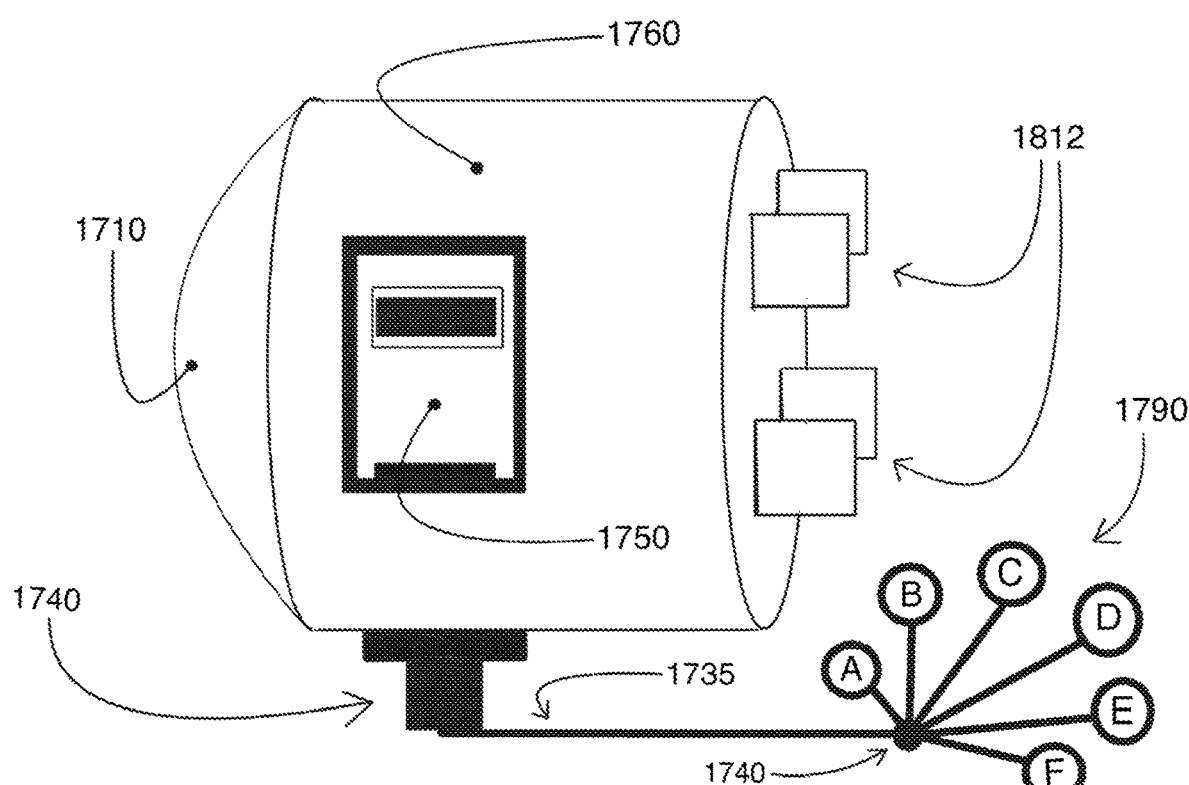
FIG. 18 is side view illustration of the all-in-one QMC of FIG. 17 separate from a panel.

FIG. 18 is side view illustration 1800 of the all-in-one QMC 1760 of FIG. 17 separate from a panel (not shown). This illustration serves to show the exposed tabs 1812 which are used to electrically (and optionally mechanically) connect the all-in-one QMC 1760 to the panel. Connection modifications to this embodiment can be made according to the different designs and configurations described in the prior embodiments.

Figure 19:
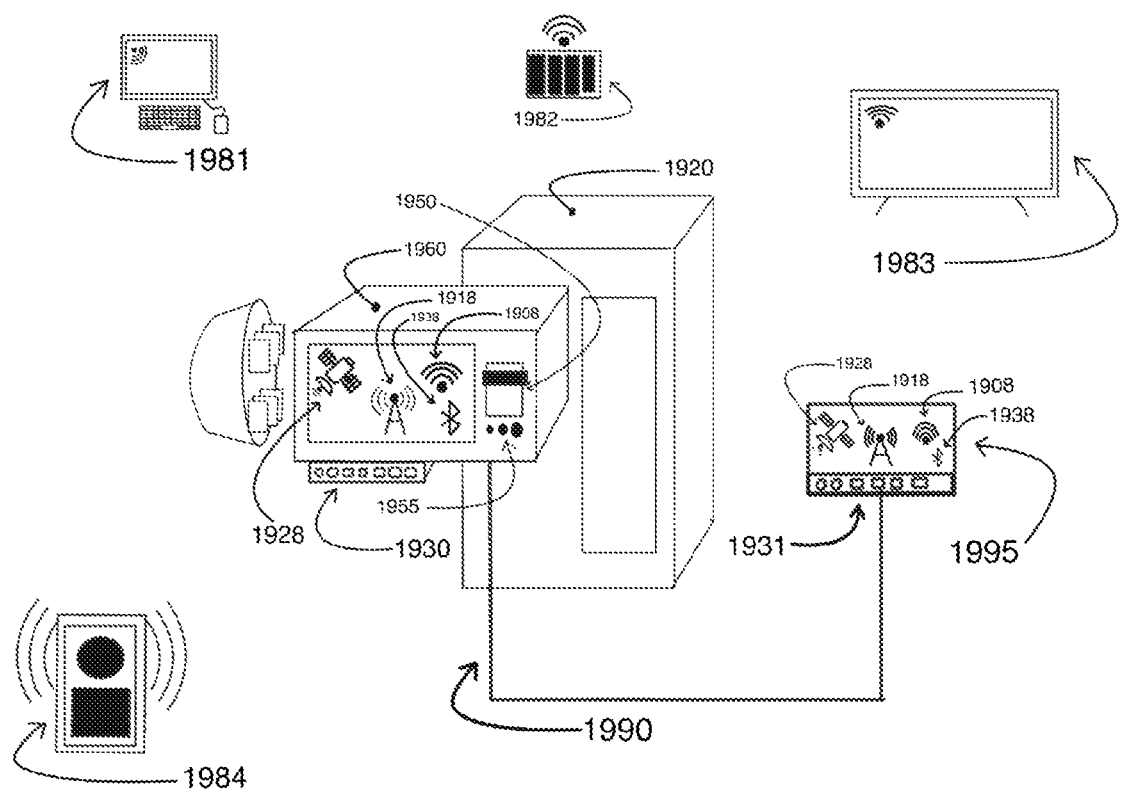
FIG. 19 is an illustration of an exemplary QMC having hard data ports.

FIG. 19 is an illustration 1900 of an exemplary QMC 1960 (shown here offset for ease of illustration only) and without optional EV connection(s) but is understood that at least one EV connection can be incorporated, if so desired. QMC 1960 is shown in this non-limiting example with a single breaker 1950 and multiple indicator lights 1955, as attached to electrical panel 1920. At least one weatherproof wired data connection jack 1930 is shown as part of the QMC 1960 including but not limited to Fiber optics, RG6, CAT 5 connectors and cables, etc. This feature enables local Telecomm companies hard-wire connection capabilities for residential, commercial and community provider subscription access, through the QMC 1960, noting wireless capabilities can also be resident in the system, as described below. Therefore, in addition to providing an external power connection, the exemplary QMC 1960 facilitates external hard "communication" connections 1930. It is understood that while the jack 1930 is shown exterior the QMC 1960, it is possible to have the jack 1930 inside the QMC's housing and protected from environmental exposure. While the exemplary embodiments here describe the Telecomm companies as subscription-based, is it understood a non-subscription format is possible, wherein data of the user's choice is consumed without need for financial commitment. As a non-limiting example, various sites provide real-time weather. Or traffic updates, and so forth.

The exemplary QMC 1960 shows capabilities of at least one Wi-Fi 1908, cellular 1918, satellite 1928, Bluetooth® (The Bluetooth® word mark and logos are registered trademarks owned by Bluetooth SIG, Inc.) 1938 wireless antenna receivers/transmitters for access to residential, commercial and community services that a Telecomm company can provide either wirelessly or through wired data connection jack port 1930. As a non-limiting example of one possible mode of use, a conduit/cable line out 1990 can be linked to a remote communication base station hub 1995 also having a data connection jack port 1931. The base station hub 1995 can also have at least one Wi-Fi 1908, cellular 1918, satellite 1928, Bluetooth® 1938 wireless antenna receiver/transmitters communications to facilitate the desired subscription services being accessible, if so designed, by QMC 1960. Alternatively, the base station's wireless communications maybe to directed to/from a non-similar system/satellite/Wi-Fi, etc. to that of the QMC's. Port for hard line 1990 at the QMC 1960 is obscured from view but can be a separate port or be part of the wired data connection jack port 1930. To a person skilled in the art, it is understood QMC 1960 and remotely located base station hub 1995 have capabilities to boost, receive and broadcast multiple signals (1908, 1918, 1928, 1938) throughout a residence, commercial facility and or neighborhood/community to various perspective wireless smart devices including but not limited to computers 1981, routers 1982, televisions 1983, extenders 1984, etc. By way of extension, the same capabilities can be afforded to smart phones, smart sensors, cameras, vehicles, automobiles, doorbells, light switches etc. In view of the above, the exemplary QMC 1960 can operate as a telecommunications gateway, if so desired. Additionally, in some embodiments, it may be desirable to have the QMC operate solely as a telecommunications gateway rather than as an over-current protection device. Thus, in these embodiments, breaker 1950 may be bypassed or rendered inoperable. For example, breaker 1950 can be replaced with a data reset button.

Conversely, base station 1995 may operate as an 'input" whereas base station 1995 can be a satellite "dish" to the QMC 1960, or a neighborhood, building fiber-to-wi-fi drop, cable-box drop, etc. wherein base station 1995 provides the desired communication gateway to QMC 1960. It is understood that QMC 1960 could have multiple telecomm companies connected, multiple breakers and multiple data input/output lines and utilize multiple wired and wireless signals including but not limited to Fiber optics, RG6, Cat 5, cellular, satellite, Wi-Fi, Bluetooth®, etc. Therefore, other possible variations are understood to be within the scope of this disclosure.

It should be further understood that this and other arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An electrical quick meter connect device, comprising:
an environmental housing with a first face is configured with connectors to mate directly to an electrical service panel in a meter connection manner, and a second face is configured with connectors to mate directly to a utility meter in an electrical service panel connection manner;
a first and second set of lines, internal to the housing, coupled to the first face to the second face;
at least one breaker switch integral to and disposed on an external side of the housing and coupled to at least one of the first and second set of lines; and
at least one external power line coupled to the at least one breaker switch and exiting the housing providing at least one of external power output and external power input,
wherein the quick meter connect device is configured to be inserted directly between a meter and electrical service panel to provide external power connection.

2. The device of claim 1, wherein the at least one breaker is connected in parallel to at least one of the first and second set of lines.

3. The device of claim 1, wherein the at least one breaker is connected in series to at least one of the first and second set of lines.

4. The device of claim 1, wherein the at least one external power line is removably coupled to the housing.

5. The device of claim 1, further comprising at least one of a timer, clock, wireless transmitter, cellular transceiver, computer, second meter, Wi-fi, cellular repeater, satellite, Bluetooth®, capacitor, inductor, chokes, is coupled to at least one of the first and second set of lines.

6. The device of claim 1, further comprising at least one of an indicator light, screen, meter, and breaker switch cover is disposed on the environmental housing.

7. The device of claim 1, wherein the second face is offset from an orientation of the first face.

8. The device of claim 7, wherein the environmental housing with the first face is disposed on a larger side of the environmental housing and the second face is disposed on a smaller side of the environmental housing.

9. The device of claim 1, further comprising at least one of a wireless transmitter, Wi-Fi, Bluetooth®, Satellite, and cellular transceiver providing at least one of logging information to an external device, global position and data services.

10. The device of claim 1, further comprising, a wired connection data jack port providing communications via at least one of fiber optic, RG6, Cat 5, and telecom cables.

11. The device of claim 9, further comprising:
a wired connection data jack port providing communications via at least one of fiber optic, RG6, Cat 5, and telecom cables; and
a remote communication base station hub connected to the wired data connection jack port.

12. The device of claim 11, wherein the remote communication base station has at least one of a wireless transmitter, Wi-Fi, Bluetooth®, Satellite, and cellular transceiver.

13. The device of claim 9, wherein information of at least one of Power Logging, Voltage, Hertz, Amperage, Total Harmonic Distortion, Power Factor, KVAR, KW, KWH and data services is communicated to an external server.

14. The device of claim 1, further comprising a lockable weatherproof cover over the at least one breaker switch.

15. The device of claim 1, wherein the at least one external power line is a set of separate power lines, each separate power line being coupled to a respective at least one breaker switch and operating independently.

16. The device of claim 15, wherein at least one of single and 3-phase power is provided to the separate power lines.

17. The device of claim 1, wherein and least one of 120V, 240V, 208V, 277V, 480V, 600V, and breaker-limited amperage is provided to the at least one external power line.

18. The device of claim 1, further comprising at least one of an electric car, solar panel, wind turbine, generator, battery storage, sub-panel, reactance bank, capacitors, inductors, chokes, grid, inverter, Wi-fi, satellite/cellular repeater, Bluetooth®, camera system, smart devices, remote wi-fi, lights, DC super charger, and charging station is connected to the at least one external power line.

19. The device of claim 1, further comprising a surge protector coupled to at least one of the first and second lines.

20. The device of claim 1, further comprising at least one of a wired base station and wireless base station, wherein the at least one external power line is coupled.

21. The device of claim 15, further comprising at least one of a package drop box, drone package drop box, and drone charging station is connected to the at least one external power line.

22. The device of claim 1, further comprising a tension tightened securing sleeve disposed about a periphery of the first face.

23. The device of claim 1, further comprising an electromagnetic lock, locking the device to a service panel when energized.

24. The device of claim 1, further comprising an extension socket having female receptacles and male tabs to mate to the first face, configured to attached to a ringed type or ringless type panel meter connection.

25. The device of claim 1, further comprising a power usage meter coupled to the second face.

26. An electrical quick meter connect device, comprising:
an environmental housing having a first side with electrical service panel fitting connectors, and another side with an integral power usage meter;
a plurality of lines internal to the housing, coupled to the first side connectors and to the power usage meter;
at least one power interrupting switch disposed on the housing and coupled to at least one set of the plurality of lines; and
at least one external power line entering the housing and coupled to the at least one power interrupting switch, providing an independent external channel of power.

27. An electrical quick meter connect device, comprising:
an environmental housing with a first face is configured with connectors to mate directly to an electrical service panel in a meter connection manner, and a second face is configured with connectors to mate directly to a utility meter in an electrical service panel connection manner;
a first and second set of lines, internal to the housing, coupled to the first face to the second face;
at least one integral breaker receptacle disposed within the housing and coupled to at least one of the first and second set of lines; and
at least one external power line coupled to a breaker inserted into the at least one integral breaker receptacle and exiting the housing providing at least one of external power output and external power input,
wherein the quick meter connect device is configured to be inserted directly between a meter and electrical service panel to provide an external power connection.

28. The device of claim 27, further comprising a breaker switch coupled to the at least one integral breaker receptacle.

\* \* \* \* \*